UNITED STATES PATENT OFFICE.

HEINRICH THRON, OF FRANKFORT-ON-THE-MAIN, GERMANY, ASSIGNOR TO VEREINIGTE CHININFABRIKEN, ZIMMER & CO., GESELLSCHAFT MIT BESCHRAENKTER HAFTUNG, OF FRANKFORT-ON-THE-MAIN, GERMANY, A FIRM.

PROCESS OF MAKING ALKYL ETHERS OF CINCHONA-ALKALOID CARBONIC ACIDS.

SPECIFICATION forming part of Letters Patent No. 701,523, dated June 3, 1902.

Original application filed April 24, 1901, Serial No. 57,322. Divided and this application filed January 8, 1902. Serial No. 88,904. (No specimens.)

*To all whom it may concern:*

Be it known that I, HEINRICH THRON, a subject of the Emperor of Germany, and a resident of Frankfort-on-the-Main, Germany, have invented certain new and useful Improvements in Acidyl Derivatives of the Alkaloids of the Cinchona-Bark, of which the following is a specification.

The United States specification No. 585,068 describes the manufacture of the alkyl ethers of quinin carbonic acid and cinchonidin-carbonic acid. These are obtained by causing alkyl ethers of chlorocarbonic acid to act upon the cinchona alkaloids. The present application, which is a divisional application from my original application, Serial No. 57,322, filed April 24, 1901, is designed to cover specifically the preparation of the alkyl ethers of the cinchona-alkaloids carbonic acids.

The present invention is based on the discovery made in the course of further experiments that the cinchona alkaloids also react with the alphyl ethers of alkyl carbonic acids, the cinchona-alkaloid ethers of the alkyl carbonic acid being thereby formed while the phenol is separated.

The new process consists in heating the cinchona alkaloids or the salts thereof by themselves or dissolved in a suitable solvent with the phenyl ether or another phenol ether of the alkyl carbonic acid, the derivative of which is to be prepared. On using, for instance, the phenyl ether of ethyl carbonic acid and quinin the ethyl ether of quinin carbonic acid is obtained.

In carrying out my new process practically I can proceed as follows: 32.4 kilograms of quinin are heated with 16.6 kilograms or more of phenyl ether of ethyl carbonic acid for a few hours to a temperature of 110° to 120° centigrade. The ethyl ether of quinin carbonic acid is then formed according to the following equation:

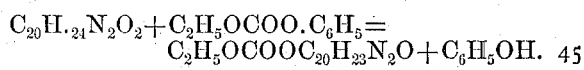

$$C_{20}H_{24}N_2O_2 + C_2H_5OCOO.C_6H_5 = C_2H_5OCOOC_{20}H_{23}N_2O + C_6H_5OH.$$

The product of the reaction is dissolved in benzene, the phenol removed therefrom by diluted ammonia, and then the ethyl ether of quinin carbonic acid extracted by a diluted acid. It is then precipitated by an alkali and crystallized out of diluted alcohol. It forms white needles, melting at 95° centigrade and having all the properties described in the United States specification No. 585,068.

Instead of the phenyl ether of the ethyl carbonic acid other alphyl ethers of ethyl carbonic acid or of other alkyl carbonic acids may be employed in the above process and instead of quinin cinchonidin or other cinchona alkaloids or the salts thereof may be used.

Having now described my invention and in what manner the same is to be performed, what I claim as new, and desire to secure by Letters Patent, is—

1. A process for the manufacture of the alkyl ethers of the cinchona-alkaloid carbonic acids which consists in causing the alphyl ethers of alkyl carbonic acids to act on the cinchona alkaloids substantially as described.

2. A process for the manufacture of the ethyl ethers of the cinchona-alkaloid carbonic acids which consists in causing the alphyl ethers of ethyl carbonic acid to act on the cinchona alkaloids substantially as described.

3. A process for the manufacture of the ethyl ether of quinin carbonic acid which consists in causing the alphyl ethers of ethyl carbonic acid to act on quinin substantially as described.

In testimony whereof I have signed my name to this specification in the presence of two subscribing witnesses.

HEINRICH THRON.

Witnesses:
 WILHELM EITEL,
 THEROPHIL REGELMANN.